US012627895B2

(12) United States Patent
Hu

(10) Patent No.: US 12,627,895 B2
(45) Date of Patent: May 12, 2026

(54) EXPOSURE COMPENSATION METHOD AND APPARATUS, AND ELECTRONIC DEVICE

(71) Applicant: VIVO MOBILE COMMUNICATION CO., LTD., Chang'an (CN)

(72) Inventor: Yafei Hu, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 91 days.

(21) Appl. No.: 18/423,626

(22) Filed: Jan. 26, 2024

(65) Prior Publication Data

US 2024/0163566 A1      May 16, 2024

Related U.S. Application Data

(63) Continuation of application No. PCT/CN2022/107299, filed on Jul. 22, 2022.

(30) Foreign Application Priority Data

Jul. 26, 2021    (CN) .......................... 202110843442.2

(51) Int. Cl.
*H04N 23/73*        (2023.01)
*G06V 10/77*        (2022.01)
(Continued)

(52) U.S. Cl.
CPC ......... *H04N 23/73* (2023.01); *G06V 10/7715* (2022.01); *G06V 10/806* (2022.01); *H04N 23/61* (2023.01); *G06V 10/82* (2022.01)

(58) Field of Classification Search
CPC ........ H04N 23/73; H04N 23/61; H04N 23/63; H04N 23/632; H04N 23/70; H04N 23/72;
(Continued)

(56) References Cited

U.S. PATENT DOCUMENTS 7,885,458 B1    2/2011  Lin
10,713,767 B2    7/2020  Liu
(Continued)

FOREIGN PATENT DOCUMENTS

CN        101904166 A    12/2010
CN        107172364 A    9/2017
(Continued)

OTHER PUBLICATIONS

First Chinese Office Action related to Application No. 202110843442. 2; reported on Oct. 10, 2022.
(Continued)

*Primary Examiner* — Mekonnen D Dagnew
(74) *Attorney, Agent, or Firm* — von Briesen & Roper, s.c.

(57)                ABSTRACT

This application discloses an exposure compensation method and apparatus, and an electronic device, and pertains to the field of photographing technologies. The exposure compensation method includes: obtaining a target image block of a preview image in a shooting preview screen; and performing exposure compensation on the preview image based on scene type probability of the target image block; or performing exposure compensation on the preview image based on reflectivity of the target image block.

10 Claims, 3 Drawing Sheets

Obtain a target image block of a preview image in a shooting preview screen ⟋ 101

Perform exposure compensation on the preview image based on scene type probability of the target image block; or perform exposure compensation on the preview image based on reflectivity of the target image block ⟋ 102

(51) Int. Cl.
G06V 10/80 (2022.01)
H04N 23/61 (2023.01)
G06V 10/82 (2022.01)

(58) Field of Classification Search
CPC ........ H04N 23/76; H04N 23/80; H04N 23/71;
G06V 10/7715; G06V 10/806; G06V
10/82; G06V 10/10; G06V 20/35
See application file for complete search history.

(56) References Cited

U.S. PATENT DOCUMENTS

| | | |
|---|---|---|
| 2007/0248342 A1 | 10/2007 | Tamminen et al. |
| 2009/0160968 A1 | 6/2009 | Prentice et al. |
| 2013/0215314 A1* | 8/2013 | Prentice ................. H04N 23/72 348/362 |
| 2016/0284095 A1 | 9/2016 | Chalom et al. |
| 2018/0220061 A1* | 8/2018 | Wang ....................... G06N 3/02 |

FOREIGN PATENT DOCUMENTS

| | | |
|---|---|---|
| CN | 107810505 A | 3/2018 |
| CN | 108200352 A | 6/2018 |
| CN | 108337447 A | 7/2018 |
| CN | 110249622 A | 9/2019 |
| CN | 109068067 B | 6/2020 |
| CN | 111654594 A | 9/2020 |
| CN | 112672069 A | 4/2021 |
| CN | 113507570 A | 10/2021 |
| KR | 20010003217 A | 1/2001 |
| WO | 03019285 A1 | 3/2003 |

OTHER PUBLICATIONS

Extended European Search Report related to Application 22848432.
5; reported on Oct. 15, 2024.
International Search Report and Written Opinion related to PCT/
CN2022/107299; reported on Sep. 5, 2022.

* cited by examiner

EXPOSURE COMPENSATION METHOD AND APPARATUS, AND ELECTRONIC DEVICE

CROSS-REFERENCE TO RELATED APPLICATIONS

This application is a continuation application of International Application No. PCT/CN2022/107299, filed on Jul. 22, 2022. International Application No. PCT/CN2022/107299 claims priority to Chinese Patent Application No. 202110843442.2, filed on Jul. 26, 2021 in China. Each of the above-listed applications is incorporated herein by reference in its entirety.

TECHNICAL FIELD

This application pertains to the field of photographing technologies, and in particular, to an exposure compensation method and apparatus, and an electronic device.

BACKGROUND

At present, the auto exposure control (AEC) technology is based on the gray world hypothesis. In the gray world hypothesis, it is generally considered that reflectivity of a gray card (namely, 18%) is medium gray. A specific principle of the AEC technology is: based on different metering modes (such as spot metering, partial metering, evaluation metering, center metering), a luminance value of a metering area is calculated, an exposure parameter (such as sensitivity, an aperture size, and a shutter speed) is gradually adjusted to make the calculated luminance value of the metering area close to medium gray, and when this condition is met, the AEC algorithm converges. In this case, a user can complete automatic exposure photographing after giving a photographing instruction.

However, when the AEC technology is used for exposure compensation, a natural scene with rich colors generally conforms to the gray world hypothesis, and when the AEC technology is used for exposure of such a scene, pictures with good visual effects can usually be obtained. However, many other scenes, such as bright scenes such as the snow-covered landscape and shopping malls, or dark scenes such as black cars and sunlight-projected forests, do not conform to the gray world hypothesis. Using the AEC technology for such scenes will make the bright scenes or dark scenes in the real world appear gray and hazy, details are distorted, and visual effects of the captured photos are poor.

SUMMARY

According to a first aspect, an embodiment of this application provides an exposure compensation method, and the method includes:

obtaining a target image block of a preview image in a shooting preview screen; and performing exposure compensation on the preview image based on scene type probability of the target image block; or performing exposure compensation on the preview image based on reflectivity of the target image block.

According to a second aspect, an embodiment of this application provides an exposure compensation apparatus, and the apparatus includes:

an obtaining module, configured to obtain a target image block of a preview image in a shooting preview screen; and a compensation module, configured to: perform exposure compensation on the preview image based on scene type probability of the target image block; or perform exposure compensation on the preview image based on reflectivity of the target image block.

According to a third aspect, an embodiment of this application provides an electronic device. The electronic device includes a processor, a memory, and a program or an instruction stored in the memory and executable on the processor, where the program or the instruction is executed by the processor to implement steps of the method according to the first aspect.

According to a fourth aspect, an embodiment of this application provides a readable storage medium. The readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

According to a sixth aspect, an embodiment of this application provides a computer program product. The program product is stored in a non-volatile storage medium, and the program product is executed by at least one processor to implement the method according to the first aspect.

According to a seventh aspect, a communication device is provided, configured to perform steps of the method according to the first aspect.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that terms used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the exposure compensation method and apparatus, and an electronic device provided in the embodiments of this application are described in detail by using specific embodiments and application scenarios thereof.

Figure 1:
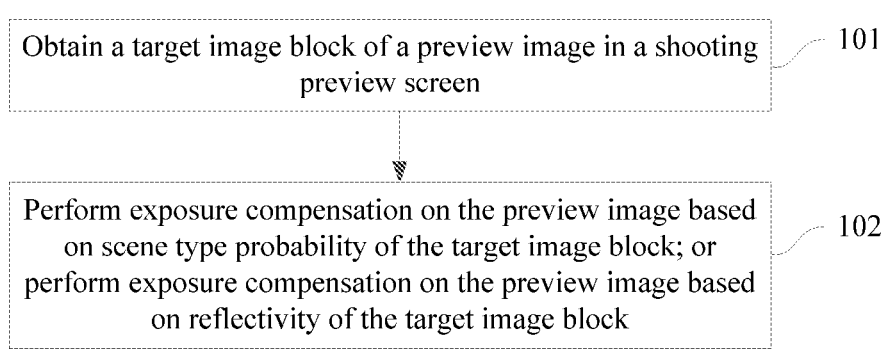
FIG. 1 is a schematic flowchart of an exposure compensation method according to an embodiment of this application.

FIG. 1 is a schematic flowchart of an exposure compensation method according to an embodiment of this application. As shown in FIG. 1, the exposure compensation method in this embodiment of this application includes the following steps.

Step 101: Obtain a target image block of a preview image in a shooting preview screen.

For example, when a user starts the application of "Camera", the shooting preview screen of the camera is started, and the system obtains image data corresponding to the target image block of the preview image in the shooting preview screen, where the target image block can be part or all of the preview images, and the image data can be YUV image data, where Y stands for Luminance (Luminance or Luma) and U and V stand for Chrominance (Chrominance or Chroma).

Step 102: Perform exposure compensation on the preview image based on scene type probability of the target image block; or perform exposure compensation on the preview image based on reflectivity of the target image block.

In this embodiment of this application, when a picture is being taken, the target image block in the preview image is first obtained. Because the scene type of the target image block reflects a type of a current shooting scene, for example, a white scene is usually a bright shooting scene, and a black scene is usually a dark shooting scene, during exposure compensation, exposure compensation can be performed on the preview image based on the scene type of the target image block, to obtain a picture with good visual effect. Alternatively, because the camera may perform metering during shooting, a metering result is related to the color, texture, vein, reflection, or luminous characteristics of a subject, and also related to the lighting of a light source, the reflectivity of the target image block can also be used as the basis for exposure compensation. For example, when the target image block includes a subject, the subject is usually the most concerned part of the user, and reflectivity of the subject also reflects brightness of the subject when it is illuminated. As a result, when exposure compensation is performed, exposure compensation can also be performed on the preview image based on the reflectivity of the subject/target image block.

Therefore, in this embodiment of this application, by performing exposure compensation based on the scene type probability or the reflectivity of the target image block in the preview image, metering deviation can be corrected, so that the subject or the whole color of the captured photo is vivid with clear details.

In some embodiments of this application, the obtaining a target image block of a preview image in a shooting preview screen includes:

detecting whether the preview image includes a subject;

in a case that the preview image does not include a subject, intercepting an image block in a central area of the preview image as the target image block; and in a case that the preview image includes a subject, intercepting an image block in a subject area of the preview image as the target image block.

For example, after the preview image displayed in the shooting preview screen is obtained, the preview image can be processed through salience object detection (salient object detection, SOD), to detect whether the preview image includes a subject, where the subject can be a person, an animal, a plant, an automobile, a building, or the like. If the preview image includes a subject, a specific position of the subject in the preview image can further be obtained through salience object detection. Optionally, when the preview image does not include a subject, considering that the user generally focuses on the central area of the image, in order to avoid influence of an edge area of the image on subsequent scene type determining and to reduce the data processing amount, the image block in the central area of the preview image can be intercepted as the target image block, that is, only the central area of the preview image is taken as the target image block. A side length of the target image block can be 0.7 to 0.9 times of a corresponding side length of the preview image, and a preferred value is 0.9 times, then an area ratio of the target image block in the preview image is 0.81. However, when the preview image includes a subject, considering that the user generally focuses on the subject included in the image, in order to avoid influence of other areas of the image other than the subject on subsequent scene type determining or influence on subsequent subject reflectivity prediction, and to reduce the data processing amount, the image block in the subject area of the preview image can be intercepted as the target image block, that is, only the area including the subject in the preview image is taken as the target image block. When the target image block including the subject is intercepted, the subject can be just framed by a rectangular frame, and position information of the subject can be described by coordinates of the upper left corner of the rectangular frame and the length and width of the rectangle. After the target image block is obtained, it can be normalized to facilitate subsequent further processing.

In some embodiments of this application, the performing exposure compensation on the preview image based on scene type probability of the target image block includes:

extracting features of the target image block at different scales, performing multilevel nonlinear transformation on the features, and outputting a weighted sum of the features;

calculating the scene type probability of the target image block based on the weighted sum of the features;

determining a scene type of the target image block based on the scene type probability, where the scene type includes a first scene, a second scene, and a third scene; and performing exposure compensation on the preview image based on a scene type of the target image block.

That is, in this embodiment of this application, a deep learning algorithm can be used to predict probability of the scene type to which the target image block belongs. For example, the scene type of the target image block can be determined by using a first neural network, where the first neural network can be trained in advance, so that the first neural network can be used to predict the scene type of the image, and prediction accuracy reaches a specific requirement. Specifically, when the scene type probability of the target image block is predicted, image features of the target image block at different scales can be extracted, then multilevel nonlinear transformation can be performed on the extracted image features, and then a weighted sum of features (namely, Logits features) is output. After that, maximum transformation (namely, softmax transformation) and other processing are performed based on the weighted sum of the features, to obtain a transformation result, that is, scene type probability of a corresponding target image block. A scene type with the highest probability can be taken as the scene type of the target image block. The scene type of the target image block can include a first scene, a second scene, and a third scene. For example, the first scene can be defined as a white scene, the second scene can be defined as a black scene, and the third scene can be defined as a scene other than the white scene and the black scene. Certainly, the first scene, the second scene, and the third scene can also be set artificially, that is, a parameter of the first neural network is set, so that after any target image block is input, the first neural network will separately generate probability for the target image block in the first scene, the second scene, and the third scene.

Figure 2:
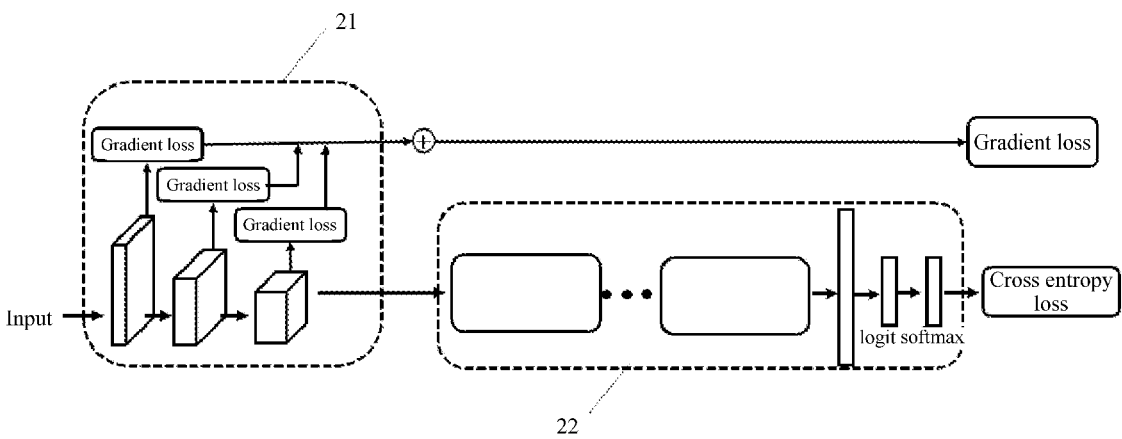
FIG. 2 is a schematic diagram of a structure of a first neural network according to an embodiment of this application.

FIG. 2 is a schematic diagram of a structure of a first neural network according to an embodiment of this application. As shown in FIG. 2, optionally, the first neural network is a depth super-resolution and completion net (SRC-Net), which mainly includes two parts: a semantic fuzzification module 21 and a first fully convolution network (Fully Convolution Network, FCN) module 22. The semantic fuzzification module 21 is configured to: narrow the gap between classes, prevent semantic information of images from being learned by the network, which leads to inaccurate classification, and provide fuzzy features for subsequent modules, while the first FCN module 22 is configured to extract deep features of images and separate correct classes (a white scene, a black scene, and a normal scene). Specifically, when the first neural network is trained, firstly, the semantic fuzzification module 21 is constructed, and after the target image block is normalized, features of the target image block are extracted by using a plurality of convolutions in the semantic fuzzification module 21, and gradient loss calculation is performed on features of different scales. The gradient loss of features can be calculated in horizontal and vertical directions respectively, and a calculation formula is: $\lambda * \sqrt{}$ $$\sqrt{\nabla_x^2 I\_grad + \nabla_y^2 I\_grad},$$

where I_grad represents feature data of a specific scale, $\lambda$ is a constant coefficient, x represents the horizontal direction, and y represents the vertical direction. A total gradient loss can be obtained by summing gradient losses of different scale features. Secondly, the first FCN module 22 is constructed, the first FCN module 22 is connected to an output of the semantic fuzzification module 21, and an overall feature is extracted by using the first FCN module 22. Finally, an output of the first FCN module 22 is connected to a fully-concatenated layer, to obtain a logits feature, and softmax transformation is performed on the logits feature. A result of softmax transformation and a real result are used to calculate a cross entropy loss, the cross entropy loss and the gradient loss are used to update the parameter of the first neural network, and finally the first neural network with a weighting parameter meeting the requirement is obtained. The first neural network can also be referred to as a first neural network model.

In this embodiment of this application, the performing exposure compensation on the preview image based on a scene type of the target image block includes:

determining an initial exposure value; and in a case that the scene type of the target image block is the first scene, increasing a preset exposure value on the basis of the initial exposure value; in a case that the scene type of the target image block is the second scene, decreasing the preset exposure value on the basis of the initial exposure value; and in a case that the scene type of the target image block is the third scene, using the initial exposure value for exposure.

That is, after the scene type of the target image block is determined, exposure compensation can be performed on the preview image based on the scene type of the target image block. Specifically, first, the auto exposure control (AEC) can be used to determine the initial exposure value based on an original algorithm, for example, to determine which exposure parameter in a preset exposure meter is used, and recorded the exposure parameter as EV0. Then, when the scene type of the target image block is the first scene, it indicates that the scene in this case does not meet the gray world hypothesis, and the scene is bright, so it is necessary to increase the exposure value on the basis of the initial exposure value, that is, to increase the preset exposure value on the basis of EV0, for example, to increase for one exposure meter number and use EV+ for exposure compensation. When the scene type of the target image block is the second scene, it indicates that the scene in this case does not meet the gray world hypothesis, and the scene is dark, so it is necessary to decrease the preset exposure value on the basis of the initial exposure value, for example, decrease for one exposure meter number on the basis of EV0, and use EV− for exposure compensation. However, in a case that the scene type of the target image block is the third scene, it indicates that the scene in this case basically meets the gray world hypothesis, so the initial exposure value can be used for exposure, that is, the used exposure meter number is kept unchanged, and EV0 is used for taking photos.

The method for performing exposure compensation based on the scene type of the target image block in the above embodiment can be applied to a case in which the preview image includes a subject, and can also be applied to a case in which the preview image does not include a subject.

In this embodiment of this application, the scene type probability of the target image block is calculated by using the first neural network, and then the scene type of the target image block is determined, and exposure compensation is performed based on the scene type. In a case that no manual adjustment of the user is required, the electronic device can automatically perform exposure compensation, restore true states in the "white" and "black" scenes, and solve the problem that photos in the "white" and "black" scenes appear gray and hazy due to the automatic exposure control strategy based on medium gray. As a result, the captured image is vivid in color, clear in detail, and good in visual effect.

In some other embodiments of this application, before the performing exposure compensation on the preview image based on reflectivity of the target image block, the method further includes:

extracting features of the target image block at different scales, and splicing the extracted features with a class feature of the target image block on a channel to obtain fused features;

performing multilevel nonlinear transformation on the fused features, and outputting a weighted sum of the fused features; and calculating reflectivity of a subject in the target image block based on the weighted sum of the fused features, and determining the reflectivity of the subject as the reflectivity of the target image block.

That is, before performing exposure compensation on the preview image based on the reflectivity of the target image block, it is necessary to obtain the reflectivity of the target image block. However, when the target image block includes a subject, the subject is usually the most concerned part of the user, and the reflectivity of the subject also reflects brightness of the subject when it is illuminated. Therefore, the reflectivity of the subject in the target image block can be used as the reflectivity of the target image block, and then the preview image can be compensated. For example, a deep learning algorithm can be used to predict probability of the scene type to which the target image block belongs. For example, a second neural network can be used to predict the reflectivity of the subject in the target image block, where the second neural network can be trained in advance, so that the second neural network can be used to predict the reflectivity of the subject in the image, and accuracy of prediction meets a specific requirement. Specifically, when the reflectivity of the target image block (subject) is predicted, image features of the target image block at different scales can be extracted first. Then, the extracted image features and a class feature of the target image block are spliced on a channel to obtain fused features. Then, multilevel nonlinear transformation is performed on the obtained fused feature, to output a weighted sum of the fused features, that is, the logits feature. Then, processing such as activation function transformation (for example, sigmoid transformation) is performed on the weighted sum of the fused features, to calculate the reflectivity of the subject included in the target image block, that is, the reflectivity of the subject can be used as the reflectivity of the target image block.

Figure 3:
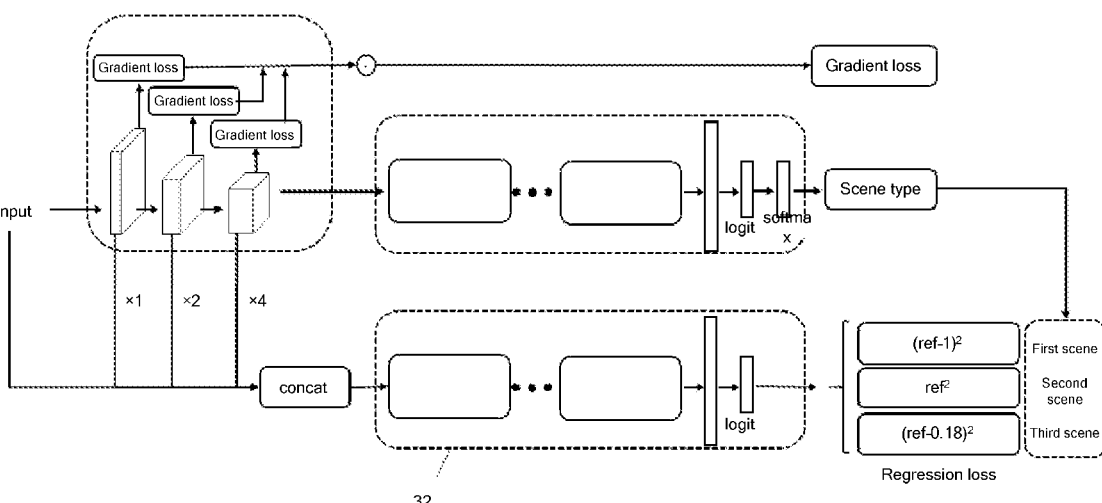
FIG. 3 is a schematic diagram of a structure of a second neural network according to an embodiment of this application.

FIG. 3 is a schematic diagram of a structure of a second neural network according to an embodiment of this application. As shown in FIG. 3, optionally, the second neural network is a class-guided reflectivity regression net (CGRR-Net), which mainly includes two parts: a scene type determining sub-network and a second FCN module 32, where the scene type determining sub-network is used to determine the scene type of the target image block. Therefore, the scene type determining sub-network may be the same as the first neural network in the above embodiment, that is, the scene type determining sub-network may include the semantic fuzzification module and the first FCN module. To avoid repetition, details are not described herein again. In this embodiment of this application, the target image block and the features (namely, a feature map) extracted from the semantic fuzzification image block are concatenated on the channel, that is, a concat operation, and then connected to the second FCN module 32. A reflectivity value of the subject in the target image block is output by using the second FCN module 32, and then a floating point number between 0 and 1 is obtained through Sigmoid transformation, that is, surface reflectivity of the subject included in the target image block. The second neural network can also be referred to as a second neural network model.

In some embodiments of this application, the performing exposure compensation on the preview image based on reflectivity of the target image block includes:

determining an initial exposure value;

determining, based on the reflectivity of the target image block, a target adjustment amount on the basis of the initial exposure value; and performing exposure compensation on the preview image based on the initial exposure value and the target adjustment amount.

That is, after the reflectivity of the subject in the target image block is predicted, exposure compensation can be performed on the preview image based on the reflectivity of the subject. Specifically, first, the auto exposure control (AEC) can be used to determine an initial exposure value based on the original algorithm, for example, to determine which exposure parameter in a preset exposure meter is used, and recorded the exposure parameter as EV0. Then, a target adjustment amount on the basis of the initial exposure value can be calculated based on the reflectivity of the target image block, that is, an amount that needs to be adjusted on the basis of EV0. Finally, exposure compensation can be performed on the preview image based on the initial exposure value and the target adjustment amount.

In some embodiments of this application, the performing exposure compensation on the preview image based on the initial exposure value and the target adjustment amount includes:

in a case that the reflectivity of the target image block is greater than reflectivity of a gray card, increasing the target adjustment amount on the basis of the initial exposure value;

in a case that the reflectivity of the target image block is less than reflectivity of a gray card, decreasing the target adjustment amount on the basis of the initial exposure value; and in a case that the reflectivity of the target image block is equal to reflectivity of a gray card, using the initial exposure value for exposure, where the target adjustment amount is equal to a first proportional constant multiplied by a ratio of the reflectivity of the subject to the reflectivity of the gray card.

That is, the target adjustment amount is $\tau \times \text{ref}/0.18$, where $\tau$ is the first proportionality constant, T can be determined during the AEC debugging stage and remains unchanged in the subsequent use process, ref is the reflectivity of the target image block, and 0.18 is the reflectivity of the gray card (that is, 18%). When the reflectivity of the target image block is greater than the reflectivity of the gray card, it indicates that the scene in this case does not meet the gray world hypothesis, and the scene is bright, so it is necessary to increase the exposure value on the basis of the initial exposure value. Specifically, the target adjustment amount is increased on the basis of the initial exposure value, that is, a specific number of the exposure meter increased on the basis of EV0 can be determined based on the target adjustment amount. When the reflectivity of the target image block is less than the reflectivity of the gray card, it indicates that the scene in this case does not meet the gray world hypothesis, and the scene is dark, so it is necessary to decrease the exposure value on the basis of the initial exposure value. Specifically, the target adjustment amount is decreased on the basis of the initial exposure value, that is, a specific number of the exposure meter decreased on the basis of EV0 can be determined based on the target adjustment amount. However, when the reflectivity of the target image block is equal to the reflectivity of the gray card, it indicates that the scene in this case basically meets the gray world hypothesis, so the initial exposure value can be used for exposure, that is, the used exposure meter number is kept unchanged, and EV0 is used for taking photos.

In the above embodiment, the method for performing exposure compensation based on the reflectivity of the target image block is applied to the case in which the preview image includes a subject.

In this embodiment of this application, the reflectivity of the subject in the target image block is predicted by using the second neural network, the reflectivity of the subject is used as the reflectivity of the target image block, and exposure compensation is performed based on the reflectivity of the target image block. In a case that no manual adjustment of the user is required, the electronic device can automatically perform exposure compensation, and a degree of exposure compensation can further be accurately determined, to restore true states in the "white" and "black" scenes, and solve the problem that photos in the "white" and "black" scenes appear gray and hazy due to the automatic exposure control strategy based on medium gray. As a result, the captured image is vivid in color, clear in detail, and good in visual effect.

In some embodiments of this application, before the second neural network is used to predict the reflectivity of the subject in the target image block, the method further includes:

training the second neural network, where the training the second neural network includes:

inputting a training image block into the semantic fuzzification module, and outputting a feature image;

inputting the feature image into the first FCN module, and outputting a scene type of the training image block;

inputting the feature image and the training image block into the second FCN module after being concatenated on a channel, and outputting the predicted reflectivity of the subject in the training image block;

calculating a loss function of the second neural network based on the predicted reflectivity of the subject in the training image block, a true value of the reflectivity of the subject in the training image block, and the scene type of the training image block; and adjusting a parameter of the second neural network based on the loss function.

Specifically, when the second neural network is trained, firstly, the training image block is input into the semantic fuzzification module, and features of different scales in the training image block are extracted by using the semantic fuzzification module, to output feature images. Then the feature images are input into the first FCN module, and the first FCN module performs overall feature extraction, to output the scene type of the training image block, which is the same as in the above embodiment and will not be described herein again. Then, the feature images and a class feature of the training image block are spliced on the channel and are input into the second FCN module, so that the second FCN module outputs the predicted reflectivity of the subject in the training image block. Then, the loss function of the second neural network is calculated based on the predicted reflectivity of the subject in the training image block, the true value of the reflectivity of the subject in the training image block (that is, an actual reflectivity value), and the scene type of the training image block. Finally, the parameter of the second neural network is adjusted based on the loss function, and the second neural network with a weighting parameter meeting the requirement is obtained.

In some embodiments of this application, the calculating a loss function of the second neural network based on the predicted reflectivity of the subject in the training image block, a true value of the reflectivity of the subject in the training image block, and the scene type of the training image block includes:

adding an item of $(ref-1)^2$ to the loss function when the scene type of the training image block is the first scene;

adding an item of $(ref)^2$ to the loss function when the scene type of the training image block is the second scene; and adding an item of $(ref-0.18)^2$ to the loss function when the scene type of the training image block is the third scene, where ref represents the predicted reflectivity of the subject in the training image block.

For example, if the second neural network in this embodiment of this application is a regression network model, a loss function thereof is a regression loss. The regression loss includes mean square error (MSE) (also referred to as quadratic loss, L2 loss), mean absolute error (MAE) (also referred to as L1 loss), Huber loss (also referred to as smoothing mean absolute error), Log-cosh loss, quantile loss function, and the like. When the loss function of the second neural network is calculated, any of the above loss functions, such as the mean square error loss function, can be adopted. In addition, in this embodiment of this application, the loss is further constrained by combining the scene type of the training image block, to improve accuracy of the second neural network to predict the reflectivity of the subject and prevent the predicted reflectivity from greatly deviating from the real value. Specifically, the loss can be constrained in the following three cases:

when the scene type of the training image block is the first scene, it indicates that the reflectivity of the subject included in the training image block is relatively large, so the item of $(ref-1)^2$ is added to the loss function, to constrain the reflectivity to take a relatively large value;

when the scene type of the training image block is the second scene, it indicates that the reflectivity of the subject included in the training image block is relatively small, so the item of $(ref)^2$ is added to the loss function, to constrain the reflectivity to take a relatively small value; and when the scene type of the training image block is the third scene, it indicates that the reflectivity of the subject included in the training image block is close to the reflectivity of the gray card, namely, 18%, so the item of $(ref-0.18)^2$ is added to the loss function, to constrain the reflectivity to take a value close to 18%, where ref represents the predicted reflectivity of the subject in the training image block.

After the above accurate exposure compensation is performed, the picture can be finally taken.

In this embodiment of this application, by performing exposure compensation based on the scene type probability or the reflectivity of the target image block in the preview image, metering deviation can be corrected, so that the subject or the whole color of the captured photo is vivid with clear details.

It should be noted that the exposure compensation method provided in this embodiment of this application may be performed by an exposure compensation apparatus, or a control module for performing the exposure compensation method in the exposure compensation apparatus. In this embodiment of this application, the exposure compensation apparatus provided in this embodiment of this application is described by using an example in which the exposure compensation apparatus performs the exposure compensation method.

Figure 4:
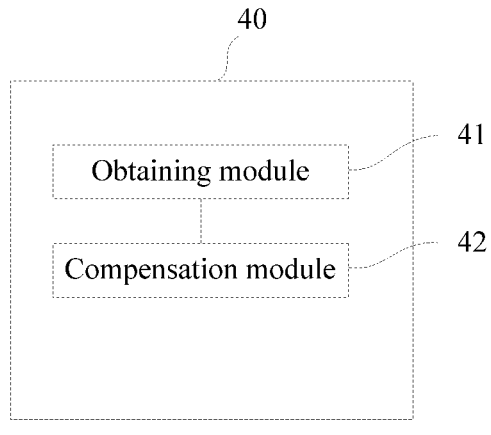
FIG. 4 is a schematic diagram of a structure of an exposure compensation apparatus according to an embodiment of this application.

FIG. 4 is a schematic diagram of a structure of an exposure compensation apparatus according to an embodiment of this application. As shown in FIG. 4, another embodiment of this application further provides an exposure compensation apparatus, and the apparatus 30 includes:

an obtaining module 41, configured to obtain a target image block of a preview image in a shooting preview screen; and a compensation module 42, configured to: perform exposure compensation on the preview image based on scene type probability of the target image block; or perform exposure compensation on the preview image based on reflectivity of the target image block.

Optionally, the compensation module includes:

an extraction unit, configured to: extract features of the target image block at different scales, perform multilevel nonlinear transformation on the features, and output a weighted sum of the features;

a probability calculation unit, configured to calculate the scene type probability of the target image block based on the weighted sum of the features;

a scene type determining unit, configured to determine a scene type of the target image block based on the scene type probability, where the scene type includes a first scene, a second scene, and a third scene; and a first exposure compensation unit, configured to perform exposure compensation on the preview image based on a scene type of the target image block.

Optionally, the first exposure compensation unit includes:

a first subunit, configured to determine an initial exposure value; and a second subunit, configured to: when the scene type of the target image block is the first scene, increase a preset exposure value on the basis of the initial exposure value; when the scene type of the target image block is the second scene, decrease the preset exposure value on the basis of the initial exposure value; and when the scene type of the target image block is the third scene, use the initial exposure value for exposure.

Optionally, the apparatus further includes:

an extraction module, configured to: extract features of the target image block at different scales, and splice the extracted features with a class feature of the target image block on a channel to obtain fused features;

an output module, configured to: perform multilevel nonlinear transformation on the fused features, and output a weighted sum of the fused features; and a calculation module, configured to: calculate reflectivity of a subject in the target image block based on the weighted sum of the fused features, and determine the reflectivity of the subject as the reflectivity of the target image block.

Optionally, the compensation module includes:

an initial exposure value determining unit, configured to determine an initial exposure value;

an adjustment amount determining unit, configured to determine, based on the reflectivity of the target image block, a target adjustment amount on the basis of the initial exposure value; and a second exposure compensation unit, configured to perform exposure compensation on the preview image based on the initial exposure value and the target adjustment amount.

Optionally, the second exposure compensation unit includes:

a third subunit, configured to: in a case that the reflectivity of the target image block is greater than reflectivity of a gray card, increase the target adjustment amount on the basis of the initial exposure value;

a fourth subunit, configured to: in a case that the reflectivity of the target image block is less than reflectivity of a gray card, decrease the target adjustment amount on the basis of the initial exposure value; and a fifth subunit, configured to: in a case that the reflectivity of the target image block is equal to reflectivity of a gray card, use the initial exposure value for exposure, where the target adjustment amount is equal to a first proportional constant multiplied by a ratio of the reflectivity of the subject to the reflectivity of the gray card.

Optionally, the apparatus further includes:

a training module, configured to train the second neural network, where the training module includes:

a first training unit, configured to: input a training image block into the semantic fuzzification module, and output a feature image;

a second training unit, configured to: input the feature image into the first FCN module, and output a scene type of the training image block;

a third training unit, configured to: input the feature image and the training image block into the second FCN module after being concatenated on a channel, and output the predicted reflectivity of the subject in the training image block;

a fourth training unit, configured to calculate a loss function of the second neural network based on the predicted reflectivity of the subject in the training image block, a true value of the reflectivity of the subject in the training image block, and the scene type of the training image block; and a fifth training unit, configured to adjust a parameter of the second neural network based on the loss function.

Optionally, the fourth training unit includes:

a first training subunit, configured to add an item of $(ref-1)^2$ to the loss function when the scene type of the training image block is a white scene;

a second training subunit, configured to add an item of $(ref)^2$ to the loss function when the scene type of the training image block is a black scene; and a third training subunit, configured to add an item of $(ref-0.18)^2$ to the loss function when the scene type of the training image block is a normal scene, where ref represents the predicted reflectivity of the subject in the training image block.

In this embodiment of this application, by performing exposure compensation based on the scene type probability or the reflectivity of the target image block in the preview image, metering deviation can be corrected, so that the subject or the whole color of the captured photo is vivid with clear details.

The exposure compensation apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a personal computer (PC), a television (TV), a teller machine, a self-service machine, or the like. This is not specifically limited in this embodiment of this application.

The exposure compensation apparatus in this embodiment of this application may be an apparatus with an operating system. The operating system may be an Android operating system, an iOS operating system, or another possible operating system. This is not specifically limited in the embodiments of this application.

The exposure compensation apparatus provided in this embodiment of this application can implement processes implemented in the method embodiments from FIG. 1 to FIG. 3. To avoid repetition, details are not described herein again.

Figure 5:
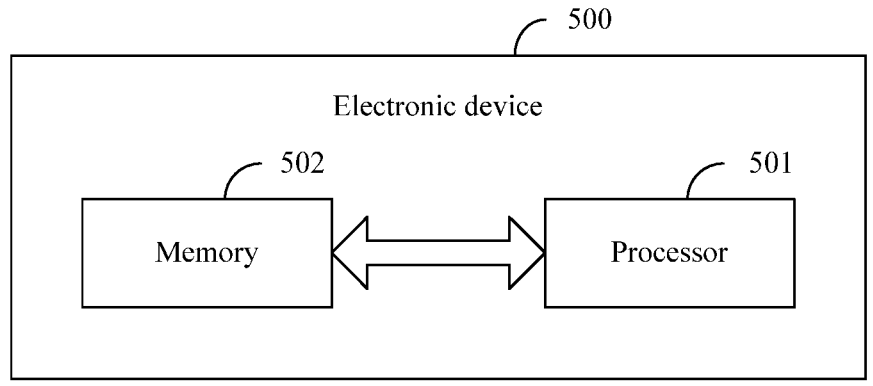
FIG. 5 is a schematic diagram of a structure of an electronic device according to an embodiment of this application.

Optionally, as shown in FIG. 5, an embodiment of this application further provides an electronic device 500, including a processor 501, a memory 502, and a program or an instruction stored in the memory 502 and executable on the processor 501. When the program or the instruction is executed by the processor 501, the processes of the foregoing exposure compensation method embodiment are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 6:
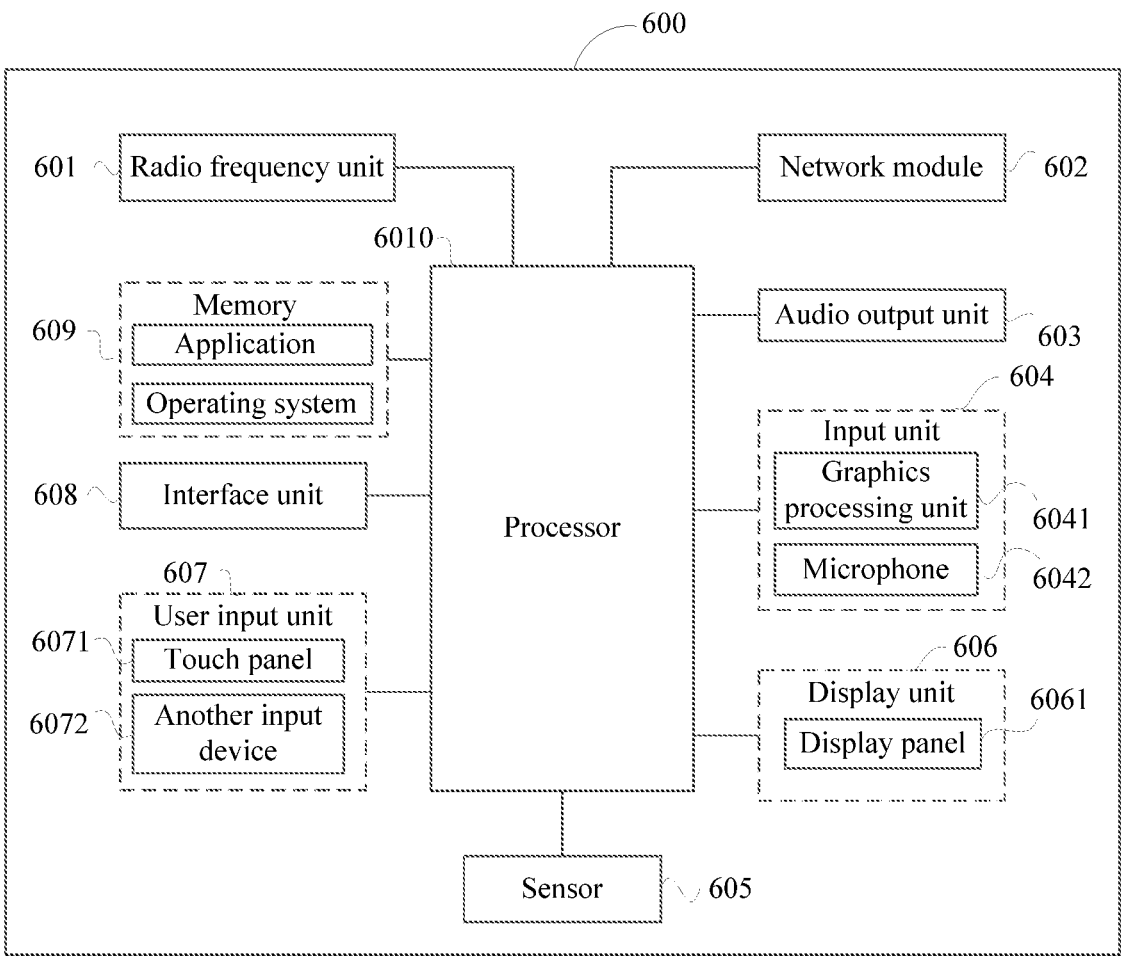
FIG. 6 is a schematic diagram of a hardware structure of an electronic device according to an embodiment of this application.

FIG. 6 is a schematic diagram of a hardware structure of an electronic device according to an embodiment of this application.

An electronic device 600 includes but is not limited to components such as a radio frequency unit 601, a network module 602, an audio output unit 603, an input unit 604, a sensor 605, a display unit 606, a user input unit 607, an interface unit 608, a memory 609, and a processor 6010.

A person skilled in the art can understand that the electronic device 600 may further include a power supply (such as a battery) that supplies power to each component. The power supply may be logically connected to the processor 6010 by using a power supply management system, to implement functions such as charging and discharging management, and power consumption management by using the power supply management system. The structure of the electronic device shown in FIG. 6 does not constitute a limitation on the electronic device. The electronic device may include components more or fewer than those shown in the diagram, a combination of some components, or different component arrangements. Details are not described herein.

The processor 6010 is configured to obtain a target image block of a preview image in a shooting preview screen; and the processor 6010 is further configured to: perform exposure compensation on the preview image based on scene type probability of the target image block; or perform exposure compensation on the preview image based on reflectivity of the target image block.

Optionally, the performing exposure compensation on the preview image based on scene type probability of the target image block includes:

extracting features of the target image block at different scales, performing multilevel nonlinear transformation on the features, and outputting a weighted sum of the features;

calculating the scene type probability of the target image block based on the weighted sum of the features;

determining a scene type of the target image block based on the scene type probability, where the scene type includes a first scene, a second scene, and a third scene; and performing exposure compensation on the preview image based on a scene type of the target image block.

Optionally, the performing exposure compensation on the preview image based on a scene type of the target image block includes:

determining an initial exposure value; and in a case that the scene type of the target image block is the first scene, increasing a preset exposure value on the basis of the initial exposure value; in a case that the scene type of the target image block is the second scene, decreasing the preset exposure value on the basis of the initial exposure value; and in a case that the scene type of the target image block is the third scene, using the initial exposure value for exposure.

Optionally, the processor 6010 is further configured to: extract features of the target image block at different scales, and splice the extracted features with a class feature of the target image block on a channel to obtain fused features;

perform multilevel nonlinear transformation on the fused features, and output a weighted sum of the fused features; and calculate reflectivity of a subject in the target image block based on the weighted sum of the fused features, and determine the reflectivity of the subject as the reflectivity of the target image block.

Optionally, the performing exposure compensation on the preview image based on reflectivity of the target image block includes:

determining an initial exposure value;

determining, based on the reflectivity of the target image block, a target adjustment amount on the basis of the initial exposure value; and performing exposure compensation on the preview image based on the initial exposure value and the target adjustment amount.

Optionally, the performing exposure compensation on the preview image based on the initial exposure value and the target adjustment amount includes:

in a case that the reflectivity of the target image block is greater than reflectivity of a gray card, increasing the target adjustment amount on the basis of the initial exposure value;

in a case that the reflectivity of the target image block is less than reflectivity of a gray card, decreasing the target adjustment amount on the basis of the initial exposure value; and in a case that the reflectivity of the target image block is equal to reflectivity of a gray card, using the initial exposure value for exposure, where the target adjustment amount is equal to a first proportional constant multiplied by a ratio of the reflectivity of the subject to the reflectivity of the gray card.

Optionally, the processor 6010 is further configured to train the second neural network, where the training the second neural network includes:

inputting a training image block into the semantic fuzzification module, and outputting a feature image;

inputting the feature image into the first FCN module, and outputting a scene type of the training image block;

inputting the feature image and the training image block into the second FCN module after being concatenated on a channel, and outputting the predicted reflectivity of the subject in the training image block;

calculating a loss function of the second neural network based on the predicted reflectivity of the subject in the training image block, a true value of the reflectivity of the subject in the training image block, and the scene type of the training image block; and adjusting a parameter of the second neural network based on the loss function.

Optionally, the calculating a loss function of the second neural network based on the predicted reflectivity of the subject in the training image block, a true value of the reflectivity of the subject in the training image block, and the scene type of the training image block includes:

adding an item of $(ref-1)^2$ to the loss function when the scene type of the training image block is the white scene;

adding an item of $(ref)^2$ to the loss function when the scene type of the training image block is the black scene; and adding an item of $(ref-0.18)^2$ to the loss function when the scene type of the training image block is the normal scene, where ref represents the predicted reflectivity of the subject in the training image block.

In this embodiment of this application, by performing exposure compensation based on the scene type probability or the reflectivity of the target image block in the preview image, metering deviation can be corrected, so that the subject or the whole color of the captured photo is vivid with clear details.

It should be understood that in this embodiment of this application, the input unit 604 may include a graphics processing unit (GPU) 6041 and a microphone 6042. The graphics processing unit 6041 processes image data of a static picture or a video obtained by an image capture apparatus (for example, a camera) in a video capture mode or an image capture mode. The display unit 606 may include a display panel 6061. Optionally, the display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein. The memory 609 may be configured to store a software program and various data, including but not limited to an application and an operating system. An application processor and a modem processor may be integrated into the processor 6010, the application processor mainly processes an operating system, a user interface, an application, and the like, and the modem processor mainly processes wireless communication. It can be understood that, alternatively, the modem processor may not be integrated into the processor 6010.

An embodiment of this application further provides a readable storage medium. The readable storage medium stores a program or an instruction. When the program or the instruction is executed by a processor, the processes of the foregoing exposure compensation method embodiments are implemented, and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing exposure compensation method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An exposure compensation method, comprising:
obtaining a target image block of a preview image in a shooting preview screen; and
performing exposure compensation on the preview image based on scene type probability of the target image block; or performing exposure compensation on the preview image based on reflectivity of the target image block;

wherein the performing exposure compensation on the preview image based on scene type probability of the target image block comprises:

extracting features of the target image block at different scales, performing multilevel nonlinear transformation on the features, and outputting a weighted sum of the features;

calculating the scene type probability of the target image block based on the weighted sum of the features;

determining a scene ty of the target image lock sed the scene type probability, wherein the scene type comprises a first scene, a second scene, and a third scene; and performing exposure compensation on the preview image based on the scene type of the target image block;

wherein the performing exposure compensation on the preview image based on scene type of the target image block comprises:

determining an initial exposure value; and in a case that the scene type of the target image block is the first scene, increasing a preset exposure value on the basis of the initial exposure value; in a case that the scene type of the target image block is the second scene, decreasing the preset exposure value on the basis of the initial exposure value; and in a case that the scene type of the target image block is the third scene, using the initial exposure value for exposure;

wherein before the performing exposure compensation on the preview image based on reflectivity of the target image block, the method further comprises:

extracting features of the target image block at different scales, and splicing the extracted features with a class feature of the target image block on a channel to obtain fused features;

performing multilevel nonlinear transformation on the fused features, and outputting a weighted sum of the fused features; and calculating reflectivity of a subject in the target image block based on the weighted sum of the fused features, and determining the reflectivity of the subject as the reflectivity of the target image block.

2. The method according to claim 1, the performing exposure compensation on the preview image based on reflectivity of the target image block comprises:

determining an initial exposure value;

determining, based on the reflectivity of the target image block, a target adjustment amount on the basis of the initial exposure value; and performing exposure compensation on the preview image based on the initial exposure value and the target adjustment amount.

3. The method according to claim 2, the performing exposure compensation on the preview image based on the initial exposure value and the target adjustment amount comprises:

in a case that the reflectivity of the target image block is greater than reflectivity of a gray card, increasing the target adjustment amount on the basis of the initial exposure value;

in a case that the reflectivity of the target image block is less than reflectivity of a gray card, decreasing the target adjustment amount on the basis of the initial exposure value; and in a case that the reflectivity of the target image block is equal to reflectivity of a gray card, using the initial exposure value for exposure.

4. An electronic device, comprising a processor, a memory, and a program or an instruction stored in the memory and executable on the processor, wherein the program or the instruction, when executed by the processor, causes the electronic device to implement:

obtaining a target image block of a preview image in a shooting preview screen; and performing exposure compensation on the preview image based on scene type probability of the target image block; or performing exposure compensation on the preview image based on reflectivity of the target image block;

wherein the performing exposure compensation on the preview image based on scene type probability of the target image block comprises:

extracting features of the target image block at different scales, performing multilevel nonlinear transformation on the features, and outputting a weighted sum of the features;

calculating the scene type probability of the target image block based on the weighted sum of the features;

determining a scene type of the target image block based on the scene type probability, wherein the scene type comprises a first scene, a second scene, and a third scene; and performing exposure compensation on the preview image based on the scene type of the target image block;

wherein the performing exposure compensation on the preview image based on a scene type of the target image block comprises:

determining an initial exp sure value; and in a case that the scene type of the target image block is the first scene, increasing a preset exposure value on the basis of the initial exposure value; in a case that the scene type of the target image block is the second scene, decreasing the preset exposure value on the basis of the initial exposure value; and in a case that the scene type of the target image block is the third scene, using the initial exposure value for exposure;

wherein the program or the instruction, when executed by the processor, further causes the electronic device to implement:

before the performing exposure compensation on the preview image based on reflectivity of the target image block, extracting features of the target image block at different scales, and splicing the extracted features with a class feature of the target image block on a channel to obtain fused features;

performing multilevel nonlinear transformation on the fused features, and outputting a weighted sum of the fused features; and calculating reflectivity of a subject in the target image block based on the weighted sum of the fused features, and determining the reflectivity of the subject as the reflectivity of the target image block.

5. The electronic device according to claim 4, the performing exposure compensation on the preview image based on reflectivity of the target image block comprises:

determining an initial exposure value;

determining, based on the reflectivity of the target image block, a target adjustment amount on the basis of the initial exposure value; and performing exposure compensation on the preview image based on the initial exposure value and the target adjustment amount.

6. The electronic device according to claim 5, the performing exposure compensation on the preview image based on the initial exposure value and the target adjustment amount comprises:

in a case that the reflectivity of the target image block is greater than reflectivity of a gray card, increasing the target adjustment amount on the basis of the initial exposure value;

in a case that the reflectivity of the target image block is less than reflectivity of a gray card, decreasing the target adjustment amount on the basis of the initial exposure value; and in a case that the reflectivity of the target image block is equal to reflectivity of a gray card, using the initial exposure value for exposure.

7. A chip, comprising a processor and a communications interface, wherein the communications interface is coupled to the processor, and the processor is configured to run a program or an instruction, to implement steps of the exposure compensation method according to claim 1.

8. A non-transitory readable storage medium, wherein the non-transitory readable storage medium stores a program or an instruction, and the program or the instruction is executed by a processor to implement:

obtaining a target image block of a preview image in a shooting preview screen; and performing exposure compensation on the preview image based on scene type probability of the target image block; or performing exposure compensation on the preview image based on reflectivity of the target image block;

wherein the performing exposure compensation on the preview image based on scene type probability of the image block comprises:

extracting features of the target image block at different scales, performing multilevel nonlinear transformation on the features, and outputting a weighted sum of the features;

calculating the scene type probability of the target image block based on the weighted sum of the features;

determining a scene type of the target image block based on the scene type probability, wherein the scene type comprises a first scene, a second scene, and a third scene; and performing exposure compensation on the preview image based on the scene type of the target image block;

wherein the performing exposure compensation on the preview image based on a scene type of the target image block comprises:

determining an initial exposure value; and in a case that the scene type of the target image block is the first scene, increasing a preset exposure value on the basis of the initial exposure value; in a case that the scene type of the target image block is the second scene, decreasing the preset exposure value on the basis of the initial exposure value; and in a case that the scene type of the target image block is the third scene, using the initial exposure value for exposure;

wherein the program or the instruction is further executed by a processor to implement;

before the performing exposure compensation on the preview image based on reflectivity of the target image block, extracting features of the target image block at different scales, and splicing the extracted features with a class feature of the target image block on a channel to obtain fused features;

performing multilevel nonlinear transformation on the fused features, and outputting a weighted sum of the fused features; and calculating reflectivity of a subject in the target image block based on the weighted sum of the fused features, and determining the reflectivity of the subject as the reflectivity of the target image block.

9. The non-transitory readable storage medium according to claim 8, the performing exposure compensation on the preview image based on reflectivity of the target image block comprises:

determining an initial exposure value;

determining, based on the reflectivity of the target image block, a target adjustment amount on the basis of the initial exposure value; and performing exposure compensation on the preview image based on the initial exposure value and the target adjustment amount.

10. The non-transitory readable storage medium according to claim 9, the performing exposure compensation on the preview image based on the initial exposure value and the target adjustment amount comprises:

in a case that the reflectivity of the target image block is greater than reflectivity of a gray card, increasing the target adjustment amount on the basis of the initial exposure value;

in a case that the reflectivity of the target image block is less than reflectivity of a gray card, decreasing the target adjustment amount on the basis of the initial exposure value; and in a case that the reflectivity of the target image block is equal to reflectivity of a gray card, using the initial exposure value for exposure.

* * * * *